United States Patent [19]

Clazing

[11] 4,091,836
[45] May 30, 1978

[54] SYSTEM COMPRISING AT LEAST ONE REACTOR

[75] Inventor: Cornelis Petrus Maria Clazing, Volendam, Netherlands

[73] Assignee: Ultra Centrifuge Nederland N.V., The Hague, Netherlands

[21] Appl. No.: 683,613

[22] Filed: May 5, 1976

[30] Foreign Application Priority Data

May 28, 1975 Netherlands ............... 7506266

[51] Int. Cl.² ............................................. E03B 11/00
[52] U.S. Cl. ....................................... 137/259; 176/87; 138/DIG. 11
[58] Field of Search ............. 176/87; 166/.5, 153–155; 285/157; 138/178, DIG. 11; 60/644; 137/259

[56] References Cited

U.S. PATENT DOCUMENTS

| | | | |
|---|---|---|---|
| 2,974,495 | 3/1961 | Pinnes et al. | 60/644 |
| 3,081,246 | 3/1963 | Edlund | 176/65 X |
| 3,150,717 | 9/1964 | Otteman et al. | 166/.5 X |
| 3,308,880 | 3/1967 | Yetman | 166/.5 X |
| 3,394,760 | 7/1968 | Childers et al. | 166/155 X |
| 3,402,743 | 9/1968 | Brueder | 138/178 |
| 3,422,895 | 1/1969 | Koonce | 166/153 X |
| 3,426,842 | 2/1969 | Corley, Jr. et al. | 166/.5 |
| 3,755,076 | 8/1973 | Lindsley | 60/644 X |
| 3,817,290 | 6/1974 | Hilgemann | 285/157 X |
| 3,866,160 | 2/1975 | Brasier | 166/153 X |
| 3,894,394 | 7/1975 | Braytenbah | 60/644 |
| 3,943,718 | 3/1976 | Berry | 60/676 |

FOREIGN PATENT DOCUMENTS 1,040,713  10/1958  Germany ............... 176/60

Primary Examiner—Peter A. Nelson
Attorney, Agent, or Firm—Cushman, Darby & Cushman

[57] ABSTRACT

A system comprising a plurality of reactors each of which is connected by a plurality of pipelines to each of a plurality of manifolds, each pipeline having a central pipelength curved in a circular arc of about 270° and connected at its ends to two substantially straight pipelengths which are arranged at a right angle with respect to each other, said reactors being arranged in at least one row, with said manifolds situated parallel to this row and above the reactors, in such a way that the distance between two successive manifolds is larger than the largest diametrical dimension of a curved central pipelength.

3 Claims, 5 Drawing Figures

SYSTEM COMPRISING AT LEAST ONE REACTOR

The invention relates to a system which comprises at least one reactor and at least one manifold, as well as at least one pipeline which forms a connection between this reactor or these reactors on the one hand and this manifold or these manifolds on the other, a central part of which pipeline is wound in the form of a loop which connects on both sides to two substantially straight pipe lengths which are arranged at an angle to each other.

The purpose of such pipe connections is to increase the freedom of movement of the reactors. The aforementioned loop in such a pipeline imparts an increased elasticity to it, so that a variety of displacements of the reactor can be conveniently taken up. These displacements or movements can result, for example, from vibrations or from thermal expansion, and during erection it can furthermore become apparent that certain differences have taken place with respect to the planned position of the reactor as compared to the position actually occupied by it. All such variations can be readily assimilated by the pipelines described, so that the erection can also be appreciably simplified.

Now the invention aims at providing such connecting pipes in a more efficient, more practical and less expensive manner than has heretofore been the case. To this end, the wound length of pipe is caused to envelop an angle which is smaller than 360°. In many cases it is practical to arrange the aforementioned pipe lengths at an angle of 90°, with the wound pipe length enveloping an angle of 270°.

In the case of reactors having the connecting points on their underside, it is highly practicable to fit the connecting pipes and the manifolds there as well. To this end, the manifolds can be accommodated, for example, in a gutter alongside or underneath the reactor or reactors. In the case of large reactors, the loops furthermore can readily assimilate thermal expansion movements.

In other systems it is frequently highly efficient to fit the manifolds above the reactor or reactors, in such a way that such manifold or manifolds is or are parallel to the row of reactors.

In some instances it will be necessary for several feed lines and dischage lines to be carried to different manifolds. In order to prevent the wound pipe lengths from becoming entangled, the manifolds are arranged on different levels over each other, in such a way that the mutual vertical distance between two successive pipelines is larger than the largest dimension of a wound pipe length.

In this last form of system, the accessibility of the various reactors for purposes of maintenance and the like is furthermore enhanced by arranging an even number of rows of reactors side by side, with the manifolds above them in the middle of this multiple row of reactors. The wound pipe lengths on both sides of the manifolds are then facing away from these pipelines, i.e. outwardly. It has been found in practice that a quadruple row of reactors provides a very fortunate solution with respect to accessibility.

In such installations it is furthermore desirable to given an opposite twist to the wound pipe lengths on both sides of the manifolds, and furthermore to increase the pitch to the measure that the reactor to which the pipeline involved is connected is removed farther from the axial centre (i.e. the axis of symmetry) of the multiple row of reactors. As a result of these last measures, the loops stay clear of each other, thus obviating any confusion resulting from entangled pipe lengths.

Some examples of embodiment will be further explained on the basis of the following figures. In these figures, FIG. 1 represents a vertical side view with partial vertical cross sections of a system equipped with two manifolds;

Figure 1:
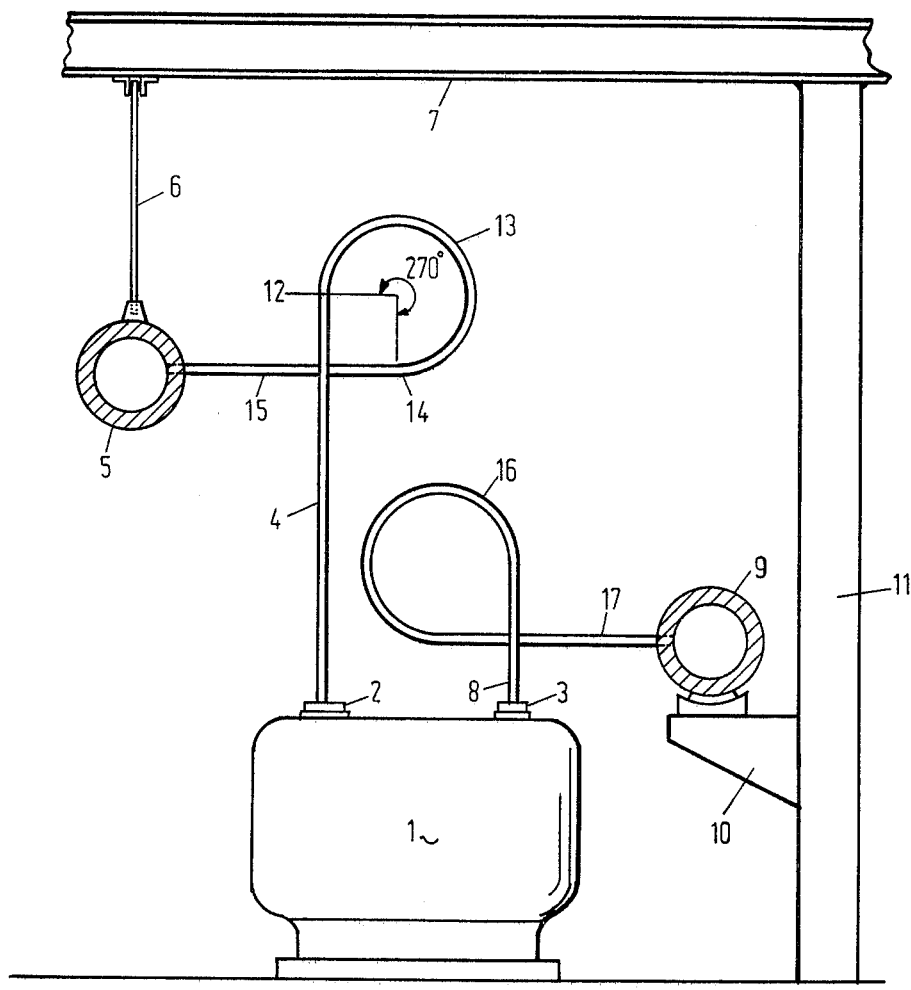

In FIG. 1, the number 1 indicates a reactor which is provided on its upper side with two connections 2 and 3. A connecting pipe 4 runs from the connection 2 to the manifold 5, which is suspended with the aid of a suspension member 6 from a girder 7 of the plant installation. The pipe 8 is fitted to the connection 3 and connects with its other end to the manifold 9 which is supported on a bracket 10 which is fastened to the structural member 11. This member can be a supporting beam or a wall of a plant installation. The straight pipe length 4 passes at 12 into a circular pipe length 13, which described an angle of 270°, whereupon, at 14, it changes again to a straight pipe length 15. In the other pipeline, the straight length 8 similarly passes into the curved length 16, which describes three quarters of a complete turn before passing into the straight pipe length 17. In practice, the reactor 1 can have an elongate shape and extend longitudinally in the direction perpendicular to the plane of drawing. Such an elongate reactor can be fitted with a one-row succession of a large number of connections 2, and in the same manner with a large number of connections 3, all of which are connected by pipelines corresponding to the lines 4 and 8 to the manifolds 5 and 9. It is also possible for the connections 2 and 3 not to be provided on one and the same reactor, but to occur on two rows of reactors that are arranged side by side. This, however, is without significance for the path followed by the pipe connections, so that this is not further indicated in the side views.

Figure 2:
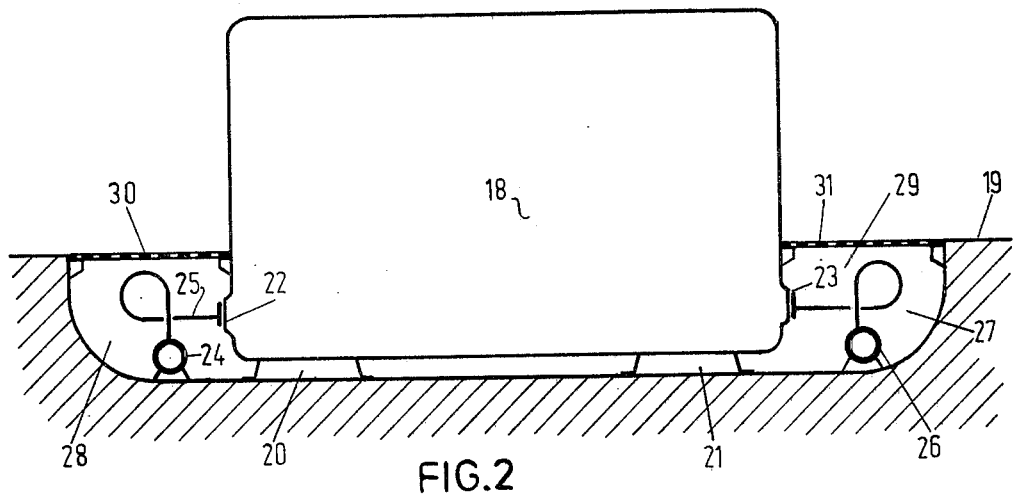
FIG. 2 is a schematic representation of a reactor installed in a partially subterranean arrangement.

FIG. 2 shows schematically the partly subterranean arrangement of a reactor under the surface 19 of a plant building. This reactor is supported on two bases 20 and 21 and is provided on both sides with one or more connections 22 and 23. A manifold 24, to be visualized perpendicular to the plane of drawing, is provided near the connection or connections 22 alongside it or them. A pipeline 25, comprising a curved winding according to the invention, ensures communication between the connection 22 and the manifold 24. The same takes place between the connection 23 and the manifold 26, use being made of the pipeline 27. The manifolds and the connecting lines are housed on both sides in spaces 28 and 29, respectively, which are covered on the upper side with grids 30 and 31, respectively.

Figure 3:
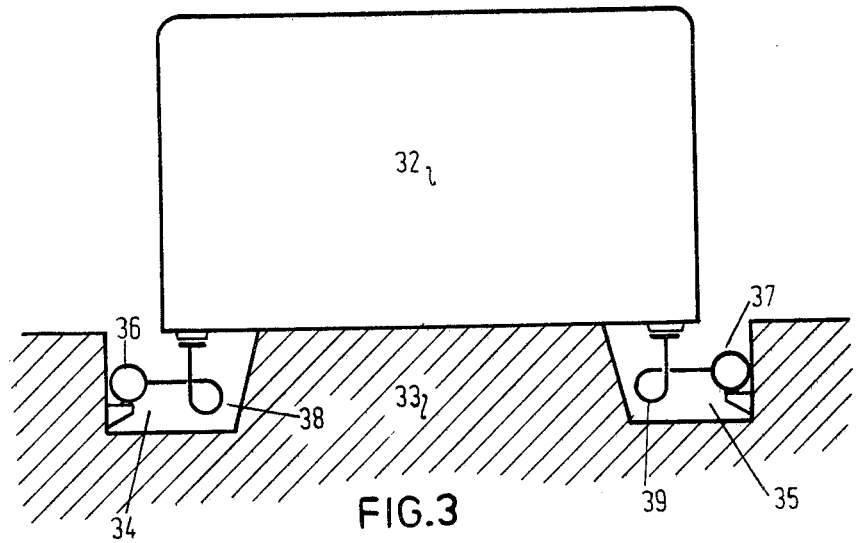
FIG. 3 is a schematic representation of a reactor with connections on the underside.

FIG. 3 illustrates an analogous arrangement for a reactor 32 which is erected on a foundation 33. On both sides of this foundation are gutters 34 and 35 in which the manifolds 36 and 37 as well as the connecting lines 38 and 39 are accommodated.

Figure 4:
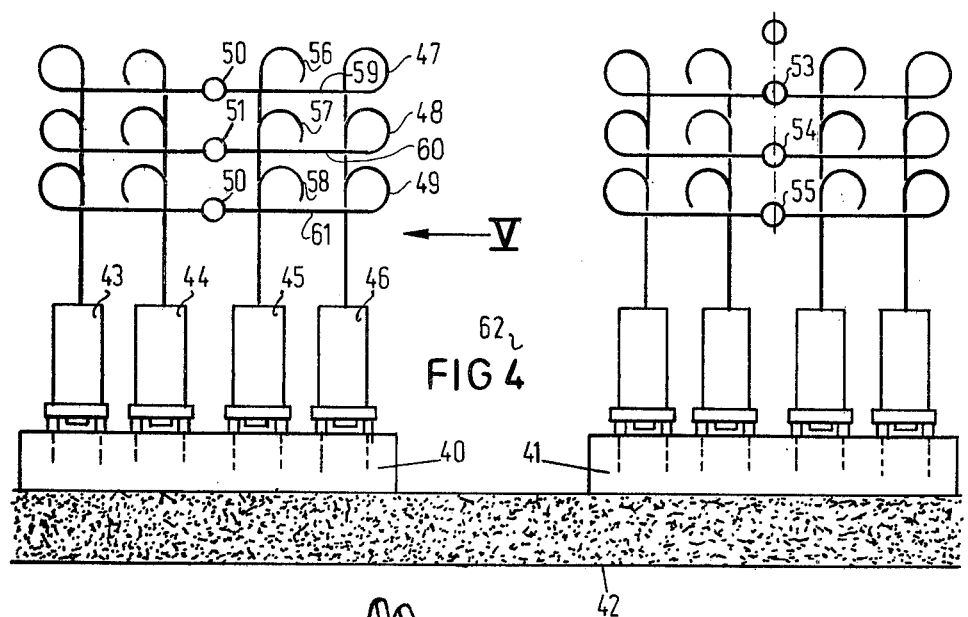
FIG. 4 is a vertical side view of two quadruple rows of reactors.
Figure 5:
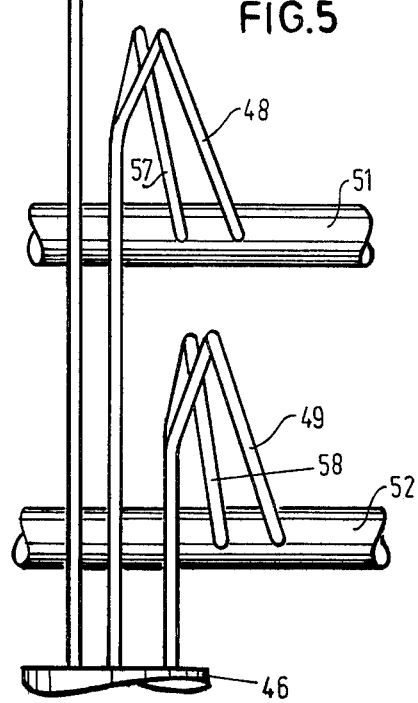
FIG. 5 is a side view according to A of the system of FIG. 4, shown on an enlarged scale.

FIG. 4 is a side view of two rows of reactors, each of which is installed on an elongate foundation plate 40 or 41, respectively, extending perpendicularly to the plane of drawing. These foundation plates are fitted on the flooring 42 of a plant building. Four rows of reactors 43, 44, 45 and 46 are erected side by side on each foundation plate. FIG. 4 illustrates the situation where each reactor must be connected to three pipelines 47, 48 and 49. This situation is clarified in FIG. 5, which is a side view according to the arrow A. In the last two figures, the manifolds are marked with 50, 51 and 52. The right half of FIG. 4 furthermore indicates a set of analogous manifolds 53, 54 and 55. Besides the looped pipe windings 47, 48 and 49, the left half of FIG. 4 also contains the looped pipelines 56, 57 and 58. The pipe loop 56 occurs in the line which connects the manifold 50 to the reactor 45, while this same reactor receives the line 57 which comes from the manifold 51 and the line 58 which comes from the manifold 52. FIG. 4 indicates clearly that three pipe levers 59, 60 and 61 are spaced at such a distance from each other that the pipe loops 56, 57 and 58, and 47, 48 and 49, respectively, cannot come into contact with them. A number of connecting lines leading to the reactors arranged side by side in rows 43 and 44 are provided analogously on the other side of the manifolds 50, 51 and 52. The reactors and the connecting lines fitted on the base plate 41 are constructed in the same manner as described for the reactors on the base plate 40. Accordingly, this requires no further explanation. Since the series of reactors of the supports 40 and 41 are arranged at some distance from each other, a space 62 is created which can be used highly efficiently for the supply and removal of reactors etc. In this manner, both the assembly and the disassembly, such as for purposes of maintenance, are greatly facilitated.

I claim:

1. A system comprising a plurality of reactors each of which is connected by a plurality of pipelines to each of a plurality of manifolds, each pipeline having a central pipelength curved in a circular arc of about 270° and connected at its ends to two substantially straight pipelengths which are arranged at a right angle with respect to each other, said reactors being arranged in multiple parallel rows, with said manifolds arranged parallel to the rows of reactors and on different levels over each other and vertically above the center line of said multiple parallel rows of reactors, in such a way that the distance between two successive manifolds is larger than the largest diametrical dimension of a curved central pipe-length and in such a way that with an even number of rows the manifolds are arranged in a vertical midplane lying between two innermost rows of reactors, the curved central pipelengths of the pipelines on both sides of the said plane facing away from each other.

2. A system as in claim 1 in which the curved central pipelengths on both sides of the manifolds are curved with opposite twist.

3. A system as in claim 2 in which the pitch in a curved pipelength is larger in proportion to the distance that the connected reactor is removed from the said midplane.

* * * * *